United States Patent [19]

McConnell et al.

[11] 4,450,250
[45] May 22, 1984

[54] POLYESTER ADHESIVES

[75] Inventors: Richard L. McConnell; Max F. Meyer, Jr.; Frederick D. Petke, all of Kingsport, Tenn.

[73] Assignee: Eastman Kodak Company, Rochester, N.Y.

[21] Appl. No.: 479,609

[22] Filed: Mar. 28, 1983

[51] Int. Cl.³ .......................... C08K 5/12; C08K 5/52; C08L 67/02
[52] U.S. Cl. ................... 524/141; 156/332; 524/294; 524/601; 524/605
[58] Field of Search .............. 260/DIG. 35; 156/332; 524/605, 601, 141, 294

[56] References Cited

U.S. PATENT DOCUMENTS

| | | | |
|---|---|---|---|
| 2,006,345 | 7/1935 | Carswell | 524/294 |
| 2,437,046 | 3/1948 | Rothrock et al. | 524/141 |
| 2,757,158 | 7/1956 | Darby et al. | 524/294 |
| 4,066,600 | 1/1978 | Pletcher et al. | 156/332 |
| 4,195,107 | 3/1980 | Timm | 524/294 |
| 4,369,135 | 1/1983 | Morgan et al. | 524/294 |

FOREIGN PATENT DOCUMENTS

| | | | |
|---|---|---|---|
| 53-90360 | 8/1978 | Japan | 524/141 |
| 57-102947 | 6/1982 | Japan | 524/141 |

*Primary Examiner*—Ronald W. Griffin
*Attorney, Agent, or Firm*—John F. Stevens; Daniel B. Reece, III

[57] ABSTRACT

Disclosed is an adhesive composition comprising:
(a) an amorphous or a crystallizable polyester having a melting point of about 80° C. to about 230° C. and a heat of fusion of 0 to about 18 calories per gram, and
(b) from about 1 to about 35% by weight of a compound selected from the group consisting of

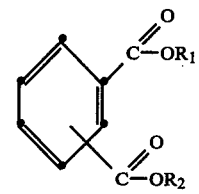

(1)

wherein $R_1$ is benzyl or phenyl and $R_2$ is benzyl, phenyl or an alkyl group containing 1 to 10 carbon atoms, and

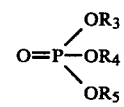

(2)

wherein $R_3$ is phenyl or benzyl, $R_4$ is phenyl or benzyl and $R_5$ is an alkyl group containing 1 to 10 carbon atoms.

5 Claims, No Drawings

POLYESTER ADHESIVES

DESCRIPTION

Technical Field

This invention relates to plasticized polyesters containing selected phthalate or phosphate plasticizers. The plasticized polyesters have substantially reduced melt viscosities, melting points, and glass transition temperatures as well as improved processing characteristics. These plasticized compositions are useful as adhesives in the form of powders, fibers, rods, and flexible films as well as for use in extruded flexible shapes such as tubing.

Background

A number of polyester polymers are known to be useful as hot-melt adhesives for structurally bonding metals, woods, plastics, and other materials. When these polyester polymers have molecular weights high enough to provide satisfactory cohesive and adhesive bond strength, their melt viscosities are so high that they cannot be applied by conventional application equipment, such as gear pumps or piston pumps, used widely in the packaging industry with conventional, low-viscosity, polyolefin-based adhesives. Reducing the molecular weight of the polyesters to lower levels severely reduces bond strength of the adhesives.

In the manufacture of packaging adhesives based on ethylene-vinyl acetate copolymer, paraffin wax or other wax additives are used to reduce the melt viscosity of the adhesive blend. However, none of these usual viscosity-reducing waxes can be used with polyester polymers to provide the desired melt viscosity because they are highly incompatible with polyesters and separate out of the mixture as low-viscosity liquids in two-phase systems.

U.S. Pat. No. 4,172,824 discloses blends of certain poly(ethylene terephthalate) copolymers containing adipic acid and 1,4-butanediol with selected benzoate ester plasticizers.

These blends have melt viscosities low enough that they can be applied with conventional application equipment for hot-melt adhesives. However, the polyester portion of these blends has a tendency to decrease in inherent viscosity (I.V.) when the blends are heated. For example, these blends are typically found to decrease in inherent viscosity about 0.3–0.4 dl/g after being heated to typical application temperatures for eight hours.

U.S. Pat. No. 4,094,721 relates to polyesters of terephthalic acid, 1,4-butanediol and 1,6-hexanediol useful as adhesives.

Benzoic acid esters are known for use in polymers. U.S. Pat. No. 3,186,961 discloses the use of various aryl carboxylic acid esters, for example, diethylene glycol dibenzoate, triethylene glycol dibenzoate, etc., in aromatic polyesters of carbonic acid. U.S. Pat. No. 2,044,612 discloses the use of certain benzoates as plasticizers for plastics, including condensation products of polyhydric alcohols and polybasic acids. Canadian Pat. No. 919,190 and British Pat. No. 815,991 also disclose the use of benzoic acid esters as plasticizers for vinyl resins.

U.S. Pat. No. 4,340,526 discloses certain terephthalate/isophthalate copolymers containing 1,4-butanediol and 1,6-hexanediol which are modified with diethyl phthalate or selected benzoate ester plasticizers.

Ester plasticizers are effective in modifying the properties of poly(vinyl chloride) and cellulose esters so that they may be used in the form of molded objects, tubing, film, sheeting, and the like. These ester plasticizers are generally quite incompatible with polyesters. For example, a commonly used plasticizer like dioctyl phthalate is quite incompatible with polyesters. Thus, it has not been possible in the past to plasticize a wide range of polyesters in order to decrease melt viscosities, glass transition temperatures, and other fundamental properties so that they may be used in certain critical adhesive, film, or fiber forms.

Description of the Invention

It has now been found that a very limited number of ester plasticizers are solvents for certain polyesters and that incorporation of these plasticizers in these polyesters can significantly reduce the melting point and glass transition temperatures of the polymers as well as to decrease the melt viscosity values of the blends.

According to the present invention, there is provided an adhesive composition comprising:

(a) an amorphous or a crystallizable polyester having a melting point of about 80° C. to about 230° C. and a heat of fusion of 0 to about 18 calories per gram, and (b) from about 1 to about 35% by weight of a compound selected from the group consisting of

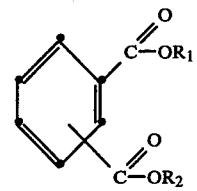 (1)

wherein $R_1$ is benzyl or phenyl and $R_2$ is benzyl, phenyl or an alkyl group containing 1 to 10 carbon atoms, and

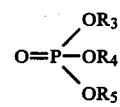 (2)

wherein $R_3$ is phenyl or benzyl, $R_4$ is phenyl or benzyl and $R_5$ is an alkyl group containing 1 to 10 carbon atoms.

Operable polyesters include both amorphous and crystallizable polyesters. Preferred polyesters include amorphous polyesters or relatively low melting polyesters with melting points up to about 230° C. which have heats of fusion of less than about 18 calories per gram (cal./g.) of polymer. Very high melting polymers such as poly(ethylene terephthalate) and poly(1,4-cyclohexylenedimethylene terephthalate) are not generally operable in the practice of this invention because of the rather high temperatures (250° C. and above) required for processing these blends.

Some useful polyesters include poly(ethylene terephthalate) copolyesters modified with cyclohexanedimethanol or diethylene glycol, poly(tetramethylene terephthalate) copolymers modified with glutaric acid and diethylene glycol, poly(hexamethylene terephthalate) copolymers modified with glutaric acid and diethylene glycol, poly(1,4-cyclohexylenedimethylene 1,4-cyclohexanedicarboxylate) modified with trimellitic acid, and poly(tetramethylene glycol) and the like.

The presence of the plasticizer provides significantly improved processing characteristics for the polyesters. For example, fibers and films may be extruded at temperatures lower than that required for the unmodified polyesters. The plasticized fibers may be used as a binder for nonwoven polyester fabrics and the bonding is conducted at relatively low temperatures. Plasticized films are readily used for laminating fabrics or attaching labels and emblems at low bonding temperatures. Generally, the plasticized films have better flexibility than the unmodified films and thus provide better hand for the bonded fabrics. Since the plasticizers are highly compatible with the polyesters, no exudation is noted on the surface of the films.

Plasticized polyesters are readily reduced to powder by cryogenic grinding techniques using pinmill or hammermill grinders. These powders may be used on fusible interlining fabrics or used to bind nonwoven fabrics and bonding is achieved at relatively low temperatures. In the binding of nonwoven fabrics, the plasticized powders may be applied to the novwoven material from a water dispersion or by spraying the dry powders onto the fibers with an electrostatic spray gun.

The plasticized polyesters are readily extruded into tubing and the tubing is much more flexible than the unmodified polyester. These flexible tubings are quite easy to wind onto a core.

The concentration of the plasticizer can vary from about 1 to about 35% by weight. A preferred concentration range is from about 5 to about 25% by weight.

The plasticizer may be incorporated into the polyester by heating the plasticizer and polymer at temperatures of about 75° to about 250° C. using mixing rolls, Banbury mills, extruders and the like or the components may be dissolved in a mutual solvent followed by evaporation of the solvent.

The polyester component of the invention is prepared by conventional techniques, for example, by ester interchange of one or more of the selected glycols with one or more of the selected dicarboxylic acids (see, for example, British Pat. No. 1,047,072).

Many of the plasticizers described herein are commercially available.

The following examples are submitted for a better understanding of the invention.

EXAMPLE 1 (Control)

Polyester A powder (1.5 g.; Polyester A is a copolyester containing terephthalic acid, 69 mol % ethylene glycol, and 31 mole % 1,4-cyclohexanedimethanol; I.V.=0.78, Tg=74° C., amorphous; $\Delta H_f$=0 cal./g.) is placed in a pyrex test tube with 30 mL of dioctyl phthalate plasticizer and the mixture is heated to 200° C. with stirring. The polyester melts and forms a liquid layer in the bottom of the test tube but it does not dissolve or mix with the dioctyl phthalate. When cooled to 23° C., the polymer solidifies and the plasticizer remains above the solid as a clear layer. This example demonstrates that Polyester A is completely insoluble in dioctyl phthalate in the 23° to 200° C. temperature range.

Similar results are obtained when dinonyl phthalate, diisononyl phthalate, diisodecyl phthalate, Santicizer 610 (phthalate esters based on alcohols containing 6 to 10 carbon atoms) or Santicizer 711 (phthalate esters based on alcohols containing 7 to 11 carbon atoms) are used instead of dioctyl phthalate.

EXAMPLE 2 (Control)

Solubility tests are conducted in dioctyl phthalate according to the procedure of Example 1 using the following polyesters:

Polyester B (a copolyester containing terephthalic acid, 70 mol % ethylene glycol, and 30 mol % 1,4-cyclohexanedimethanol; I.V.=0.62; Tg=75° C., amorphous; $\Delta H_f$=0 cal./g.).

Polyester C (a copolyester containing terephthalic acid, 68 mol % ethylene glycol, and 32 mol % 1,4-cyclohexanedimethanol; I.V.=0.45; Tg=74° C., amorphous; $\Delta H_f$=0 Cal./g.).

Polyester D (a copolyester containing terephthalic acid, 60 mol % 1,4-cyclohexanedimethanol, and 40 mol % ethylene glycol; I.V.=0.72; Tm=220° C.; $\Delta H_f$=0.9 cal./g., Tg=81° C.).

Polyester E (a copolyester containing terephthalic acid, 63 mol % ethylene glycol, and 37 mol % diethylene glycol; I.V.=0.66; Tm=184° C.; $\Delta H_f$=1.6 cal./g.; Tg=54° C.).

Polyester F (a copolyester containing 72 mol % terephthalic acid, 28 mol % glutaric acid, 55 mol % 1,4-butanediol and 45 mol % diethylene glycol; $\Delta H_f$=3.5 cal./g.; I.V.=0.83; Tm=110° C., Tg=6° C.).

Polyester G (a copolyester containing 81 mol % terephthalic acid, 19 mol % glutaric acid, 55 mol % 1,4-butanediol and 45 mol % diethylene glycol; $\Delta H_f$=3.6 cal./g.; I.V.=0.81; Tm=126° C.; Tg=10° C.).

Polyester H (a copolyester containing 79 mol % terephthalic acid, 21 mol % glutaric acid, 80 mol % 1,6-hexanediol, an 20 mol % diethylene glycol; $\Delta H_f$=6.2 cal./g.; I.V.=0.72; Tm=100° C.; Tg=−1° C.).

Polyester I (a copolyester containing 76 mol % trans-1,4-cyclohexanedicarboxylic acid, 24 mol % glutaric acid, 75 mol % 1,4-butanediol and 25 mol % diethylene glycol; I.V.=0.82; Tm=108° C.; $\Delta H_f$=2.9 cal./g.; Tg=13° C.).

Polyester J (a copolyester containing 99.5 mol % trans-1,4-cyclohexanedicarboxylic acid, 0.5 mol % trimellitic anhydride, 1,4-cyclohexanedimethanol, and 25 wt. % of polytetramethylene glycol with MW 1000; $\Delta H_f$=3.4 cal./g.; I.V.=1.05; Tm=200° C.; Tg=−5° C.).

Polymer K (a copolyester of terephthalic acid and 1,4-butanediol, I.V.=0.7, Tm=225° C., Tg=25° C., and $\Delta H_f$=18.0 cal./g.

Polyesters B, C, D, E, F, G, H, I, J, and K are found to be insoluble in dioctyl phthalate.

EXAMPLE 3

The solubility test of Example 1 is repeated using butyl benzyl phthalate instead of dioctyl phthalate. Polymers A, B, C, D, E, F, G, H, I, J, and K are found to dissolve in butyl benzyl phthalate at a temperature of about 70° C. or higher and completely clear solutions are obtained. Similarly good solubility results are obtained when methyl benzyl phthalate, ethyl benzyl phthalate, propyl benzyl phthalate, isobutyl benzyl phthalate, hexyl benzyl phthalate, dibenzyl phthalate, and phenyl benzyl phthalate are used instead of butyl benzyl phthalate.

EXAMPLE 4

The solubility test of Example 1 is repeated except that isodecyl diphenyl phosphate is used instead of dioctyl phthalate. Polymers A, B, C, D, E, F, G, H, I, and J are found to dissolve readily in hot isodecyl diphenyl phosphate and completely clear solutions are obtained. Similarly good solubility results are obtained when octyl phenyl benzyl phosphate, butyl diphenyl phosphate, ethyl diphenyl phosphate, and isobutyl dibenzyl phosphate are used instead of isodecyl diphenyl phosphate.

EXAMPLE 5

Polyester A (47.5 g.) is heated with butyl benzyl phthalate (2.5 g.) in a Brabender Plastograph mixer at 170° C. for five minutes in the melt phase to provide a blend containing 5 wt. % plasticizer. The plasticized polyester has a melt viscosity of 4,125,000 cp. at 190° C. (Melt Index Method; melt index=2 g./10 minutes) and a glass transition temperature of 57° C. The modulus of a 3 mil (0.08 mm) compression molded film is 200,000 psi (14090 kg./cm.$^2$ (by ASTM-882). For comparative purposes the unplasticized polyester has zero melt flow at 190° C. and a glass transition temperature of 74° C. The modulus of a 3 mil (0.08 mm) film of the unplasticized polyester is 187,000 psi (13175 kg./cm.$^2$). Similar results are obtained with isodecyl diphenyl phosphate. T-peel bonds (4×4 inches) (10×10 cm.) are made on a Sentinel heat sealer with 3 mil (0.08 mm) compression molded films of unplasticized polyester as well as with plasticized polyester using polyester/cotton twill fabric using three second bonding time, 20 psig (1.4 kg./cm.$^2$ gage) pressure and the temperatures shown below. The bonds are cooled on a stone bench top, ½ inch (1.27 mm) is trimmed from each side and three one-inch (2.54 cm.) T-peel bonds are cut from each specimen. Bonds are tested at 23° C. on an Instron tester at a crosshead speed of two in./min. (5.1 cm./min.) with the following results:

| Bonding Temperature °F., (°C.) | T-Peel Bond Strength, Pli (Kg./linear cm.) | |
|---|---|---|
| | Unplasticized | Plasticized |
| 300 (149) | 0 | 1.1 (0.196) |
| 350 (177) | 1.3 (0.23) | 2.4 (0.42) |
| 400 (204) | 6.5 (1.16) | 10.6 (1.89) |

Bonding temperatures above 400° F. (204° C.) scorch and degrade the fabric. This example illustrates that adding only 5% of the soluble plasticizer to the polyester lowers bonding temperature and increases bond strength. Bonds made with the plasticized polyester show excellent resistance to five cycles of commercial laundering and dry cleaning.

EXAMPLE 6

The procedure of Example 5 is repeated except that Polyester A is blended with 25 wt. % butyl benzyl phthalate. The plasticized polyester has a melt viscosity of 493,000 cps at 190° C. (melt index=17 g./10 minutes at 190° C.) and a glass transition temperature of 23° C. The modulus of a 3 mil (0.08 mm) compression molded film by ASTM-882 is 1,000 psi (70.5 kg./cm.$^2$).

Compared to the unplasticized polyester the plasticized composition is easily extruded into film and tubing and injection molded into shaped articles at much lower pressures and shorter cycle times.

T-peel bonds 4×4 inches (10×10 cm.) are made with 3-mil (0.08 mm.) compression molded film of unplasticized polyester as well as with plasticized polyester samples using polyester/cotton twill fabric on a Sentinel heat sealer at the temperatures shown below (three second bonding time; 20 psig (1.4 kg./cm.$^2$ gage) bonding pressure). Immediately after bonding, the bonds are quenched by placing the bonds on the stone bench top (temperature ~23° C.) until the bonds have cooled to room temperature. One-half inch (1.27 cm.) is trimmed for each side and three one-inch (2.54 cm.) T-peel bonds are cut from each specimen. Bonds are tested at 23° C. on an Instron tester at a crosshead speed of two inches/minute (5.1 cm./min.) with the following results.

| Unplasticized Polyester | | Plasticized Polyester | |
|---|---|---|---|
| Bonding Temp., °F. (°C.) | T-Peel Bond Strength, Pli (kg/linear cm) | Bonding Temp., °F. (°C.) | T-Peel Bond Strength, Pli (kg/linear cm) |
| 300 (149) | 0 | 250 (121) | 6.6 (1.18) |
| 350 (177) | 1.3 (0.23) | 300 (149) | 15.5 (2.77) |
| 400 (204) | 6.5 (1.16) | 350 (177) | 9.7 (1.73) |

The addition of 25 wt. % butyl benzyl phthalate to Polyester A caused a reduction of at least 100 F.° (37.7 C.°) in its bonding temperature and provided a significant increase in bond strength compared to the control (15.5 vs. 0 pli (2.77 vs. 0 kg./cm.) at a bonding temperature of 149° C.).

Similarly good results are obtained when the Polyester A is plasticized with isodecyl diphenyl phosphate.

EXAMPLE 7

Polyester B (4.25 pounds or 1.93 kg.) and 0.75 pounds (0.34 kg.) of butyl benzyl phthalate are melt blended in a ¾ inch (1.9-cm.) Brabender extruder at ~175° C. and pelletized. The blend is cryogenically ground in a Mikro Pulverizer with liquid nitrogen using a 0.08-in. (2 mm) screen. After drying the powder at 40° C. overnight under vacuum (25 inches of water; 635 kg./m.$^2$) the powder is classified by screening through 70 and 200 U.S. mesh screens by shaking for 15 minutes on a mechanical vibrator.

A polyester nonwoven web is formed by passing polyester staple fiber through a textile card machine to give a web weight of 4 ounces/yard$^2$ (136.3 gm./m.$^2$). Medium powder (70–200 mesh) of the plasticized polyester is fluidized with nitrogen and sprayed on the web with an electrostatic gun to give a uniform coating. The web is passed through a heating chamber of infrared heaters to fuse the adhesive powder and then through calendering rolls. The weight of adhesive in the web is 15 wt. %. The web has a nice soft hand and is strong and uniformly bonded in both the machine and transverse directions. Bonding of a nonwoven web with 70–200 mesh powder of the unplasticized polyester in a similar manner gave a very weak web probably because of the high melt viscosity of the polyester and its inability to flow out.

EXAMPLE 8

The procedure of Example 7 is repeated except that Polyester F is melt blended with 10 wt. % of butyl benzyl phthalate. A nonwoven web bonded with medium powder (70–200 mesh) of this plasticized polyester has a nice soft hand and good strength in both the machine and transverse directions.

EXAMPLE 9

Polyester B is dissolved in methylene chloride with 10 wt. % butyl benzyl phthalate (based on the weight of polyester). The methylene chloride is evaporated and the resultant blend is granulated and dried at 40° C. under vacuum (135 mm. mercury) overnight. The blend is melt spun at 220° C. using a 1.5 inch (3.8 cm.) extruder equipped with a gear pump and a 45-hole spinnerette (0.5 mm diameter holes). The filaments coming out of the spinnerette are air cooled and wound on a take-up roll. The filaments are subsequently drafted 3x at 70°–100° C., crimped at 23° C. with 12 crimps/inch (4.7 crimps/cm.) in a stuffer box and cut into 1½ inch staple fiber. A nonwoven web is prepared by mixing 20 wt. % of this binder fiber with polyester staple fiber, passing the blend of fibers through a Shirley textile card machine and then through a bank of infrared heaters to fuse the binder fibers and bond the web. The nonwoven web has a nice soft hand and good strength in both the machine and transverse direction.

Unmodified Polyester B is not spinnable into fibers at temperatures less than 300° C.

EXAMPLE 10

Polyester A is melt blended with 15 wt. % butyl benzyl phthalate in a 1¾ inch extruder at a melt temperature of ~225° C. The extruded blend is passed through a water cooling bath and pelletized. The pellets are dried under vacuum at 40° C. overnight. The blend has a melt viscosity of 1,550,000 cp a 190° C. (melt indexer; 2160 g. weight) and a Tg of ~50° C. by DSC analysis. The blend is injection molded on a New Britain molding machine at a melt temperature of 230° C. into a spiral mold. The plasticized polyester flowed 90 mm at a pressure of 700 psi (49.2 kg./cm.$^2$) compared to 58 mm for the unplasticized polyester.

EXAMPLE 11

The addition of 25 wt. % butyl benzyl phthalate to Polyester B caused induced crystallization and a Tm of 157° C. with a $\Delta H_f$ of 0.63 cal/g. This polymer is normally considered to be completely amorphous showing only a Tg by DSC analysis.

The term "polyester" is used herein in a generic sense to include copolyesters. Also, esters of the acids rather than the acids themselves may be used in preparing the polyesters. For example, dimethyl terephthalic may be used in place of terephthalic acid if desired.

Although not required in the practice of this invention, small amounts of stabilizers, pigments, colorants, anticaking agents, fluorescent agents or other additives may be used if desired.

Whenever the term "inherent viscosity" (I.V.) is used in this application, it will be understood to refer to viscosity determinations made at 25° C. using 0.50 gram of polymer per 100 ml. of a solvent composed of 60 percent phenol and 40 percent tetrachloroethane.

For purpose herein, "melting point" (Tm) is measured by a differential scanning calorimeter using standard, well-known techniques.

The "heat of fusion" $\Delta H_f$ of polymers is the amount of heat absorbed when crystallizable polymers are melted. $\Delta H_f$ values are readily obtained using differential scanning calorimeters (Perkin-Elmer). For example, one method for determining $\Delta H_f$ is described in *Journal of Applied Polymer Science*, 20, 1209 (1976). Measurement of $\Delta H_f$ is also described in duPont Thermal Analysis Bulletin No. 900-8 (1965). Qualitatively, it is possible to compare the degree of crystallinity of polymers by comparing their $\Delta H_f$ values.

As indicated above, when copolyesters prepared as described above are employed as melt adhesives to laminate various fabric systems, metal strips and the like, excellent bonds result. The strength of the bonds is determined by the so-called "peel test" based on a modification of the ASTM "T-Peel Test" set forth on pages 63 and 64 on the 1964 edition of the BOOK OF ASTM STANDARDS, published by the American Society for Testing Materials, and more specifically identified as Test Number D-1876-61-T.

The invention has been described in detail with particular reference to preferred embodiments thereof but it will be understood that variations and modifications can be effected within the spirit and scope of the invention.

We claim:
1. Adhesive composition comprising:
   (a) an amorphous or a crystallizable polyester having a melting point of about 80° C. to about 230° C. and a heat of fusion of 0 to about 18 calories per gram, and
   (b) from about 1 to about 35% by weight of a compound selected from the group consisting of

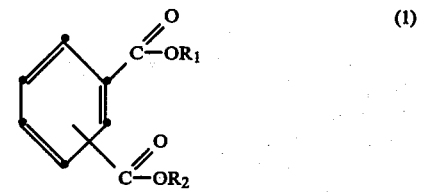

wherein $R_1$ is benzyl or phenyl and $R_2$ is benzyl, phenyl or an alkyl group containing 1 to 10 carbon atoms, and

wherein $R_3$ is phenyl or benzyl, $R_4$ is phenyl or benzyl and $R_5$ is an alkyl group containing 1 to 10 carbon atoms.

2. An adhesive composition according to claim 1 wherein said polyester is a copolymer of poly(ethylene terephthalate), poly(tetramethylene terephthalate), poly(hexamethylene terephthalate), or poly(1,4-cyclohexylene dimethylene 1,4-cyclohexanedicarboxylate).

3. An adhesive composition according to claim 1 wherein said compound is

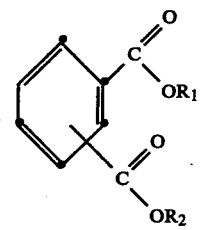

wherein $R_1$ is benzyl or phenyl and $R_2$ is benzyl, phenyl or an alkyl group containing 1 to 10 carbon atoms.

4. An adhesive composition according to claim 1 wherein said compound is
wherein $R_3$ is phenyl or benzyl, $R_4$ is phenyl or benzyl and $R_5$ is an alkyl group containing 1 to 10 carbon atoms.
5. An adhesive composition according to claim 1 wherein said compound is present in an amount of from about 5 to about 25% by weight, based on the weight of the composition.
* * * * *